(12) United States Patent
Park et al.

(10) Patent No.: US 8,497,936 B2
(45) Date of Patent: Jul. 30, 2013

(54) DISPLAY APPARATUS INCLUDING RECEIVING CONTAINER RECEIVING A CAMERA MODULE AND A DISPLAY PANEL

(75) Inventors: Jin-Ho Park, Suwon-si (KR); Chang-Young Bang, Suwon-si (KR); Jae-Min Ha, Yongin-si (KR); Tae-Gil Kang, Hwaseong-si (KR); Yong-Eun Park, Asan-si (KR); Man-Soo Kim, Seongnam-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 0 days.

(21) Appl. No.: 13/236,451

(22) Filed: Sep. 19, 2011

(65) Prior Publication Data
US 2012/0200767 A1    Aug. 9, 2012

(30) Foreign Application Priority Data
Feb. 7, 2011    (KR) .................. 10-2011-0010676

(51) Int. Cl.
*H04N 5/225*    (2006.01)
*H04N 5/222*    (2006.01)

(52) U.S. Cl.
USPC .................................. 348/375; 348/333.01

(58) Field of Classification Search
USPC . 345/901, 905; 361/679.01–679.33; 348/373, 348/375, 207.99, 273–275
See application file for complete search history.

(56) References Cited

U.S. PATENT DOCUMENTS

| | | | |
|---|---|---|---|
| 2006/0176254 A1* | 8/2006 | Lee et al. | 345/87 |
| 2008/0090618 A1* | 4/2008 | Lim et al. | 455/566 |
| 2009/0015565 A1* | 1/2009 | Hong et al. | 345/173 |
| 2010/0073202 A1* | 3/2010 | Mazed | 340/999 |
| 2010/0099458 A1* | 4/2010 | Shin et al. | 455/556.1 |

FOREIGN PATENT DOCUMENTS

| | | |
|---|---|---|
| JP | 2000-020163 | 1/2000 |
| KR | 10-2009-0041051 | 4/2009 |
| KR | 10-2010-0012516 | 2/2010 |

OTHER PUBLICATIONS

English Abstract for Publication No. 2000-020163.
English Abstract for Publication No. 10-2009-0041051.
English Abstract for Publication No. 10-2010-0012516.

* cited by examiner

*Primary Examiner* — Tuan Ho
*Assistant Examiner* — Chan Nguyen
(74) *Attorney, Agent, or Firm* — F. Chau & Associates, LLC

(57) ABSTRACT

A display apparatus includes a display panel for display an image, a camera module and a receiving container. The camera module includes a lens part mounted on a printed circuit board. The receiving container includes a main receiving space receiving the display panel and a sub receiving space extended from the main receiving space and receiving the camera module.

20 Claims, 7 Drawing Sheets

DISPLAY APPARATUS INCLUDING RECEIVING CONTAINER RECEIVING A CAMERA MODULE AND A DISPLAY PANEL

PRIORITY STATEMENT

This application claims priority under 35 U.S.C. §119 to Korean Patent Application No. 2011-10676, filed on Feb. 7, 2011 in the Korean Intellectual Property Office (KIPO), the contents of which are herein incorporated by reference in their entirety.

BACKGROUND

1. Technical Field

Exemplary embodiments of the present disclosure relate to a display apparatus and more particularly, to a display apparatus having a camera module.

2. Description of Related Art

Generally, a display apparatus includes a display panel for displaying an image and a light supplying assembly for providing the display panel with light. The light supplying assembly includes a light source module generating the light and a plurality of optical elements supplying the light to the display panel. The display panel may include a liquid crystal material for adjusting the transmission of the light therethrough.

Customer demand for products having various capabilities has lead to the implementation of camera modules together with display apparatus, such as in laptop computers. Generally, the camera module is manufactured separately from the display panel, and is installed in the product separately from a receiving part that receives the display panel. These products typically have small connection spaces available for the camera module. Moreover, a connecting cable structure of the camera module and the display panel may be complicated by the small connection spaces.

SUMMARY

According to one exemplary embodiment of the present disclosure, a display apparatus includes a display panel adapted to display an image, a camera module and a receiving container. The camera module includes a lens part mounted on a printed circuit board. The receiving container includes a main receiving space receiving the display panel and a sub receiving space extended from the main receiving space and receiving the camera module.

The receiving container may further include sidewalls, a first bottom connected to the sidewalls and a second bottom extended from a first sidewall of the sidewalls. The main receiving space may be defined by the sidewalls and the first bottom and the sub receiving space may be defined by the first sidewall and the second bottom.

A protrusion portion may be formed at a side of the second bottom fixing a position of the camera module.

The second bottom may be extended from an upper portion of the first sidewall, and the sub receiving space may be formed on a lower surface of the second bottom.

The second bottom may include an opening portion, through which the lens part may be exposed at an upper surface of the second bottom.

The camera module may be fixed to a lower surface of the second bottom by an adhesion member.

The camera module may further include a first flexible film extended along a bottom surface of the first bottom opposite the main receiving space.

The display panel may further include a second flexible film, and the first flexible film and the second flexible film may be branched off from a common flexible film.

The second bottom may be extended from a central portion of the first sidewall, and the sub receiving space may include an upper receiving portion defined by an upper portion of the first sidewall and the second bottom and a lower receiving portion defined by a lower portion of the first sidewall and the second bottom.

The camera module may be received at the upper receiving portion of the sub receiving space.

The camera module may further include a first flexible film, and the second bottom may include an opening portion, through which the first flexible film may be extended along the first bottom opposite the main receiving space.

The camera module may further include a first flexible film, and the first flexible film may be bent to a side end of the second bottom and extended along the first bottom opposite the main receiving space.

The display panel may further include a second flexible film, and the first flexible film and the second flexible film may be branched out from a common flexible film.

An upper area of a side end of the display panel may be covered by a tape.

According to another exemplary embodiment of the present disclosure, a display apparatus includes a display panel adapted to display an image, a camera module, a mold frame supporting the display panel and the camera module, and a receiving container. The camera module includes a lens part mounted on a printed circuit board. The receiving container receives the display panel, the camera module and the mold frame.

The mold frame may include a main body portion and a supporting portion protruding from the main body portion, and a side end of the display panel and the camera module may be disposed adjacent to each other at the supporting portion.

The display apparatus may further include a top chassis disposed over the display panel and covering the mold frame and the camera module.

The top chassis may include an opening portion, through which the lens part of the camera module may be exposed.

According to an embodiment of the present disclosure, a receiving container includes a main receiving space receiving a display panel, and a sub receiving space extended away from the main receiving space and receiving a camera module, wherein the receiving container is formed as one structure.

The receiving container may further include a plurality of sidewalls and a first bottom connected to the sidewalls defining the main receiving space and a second bottom extended from a first sidewall of the sidewalls, the first sidewall and the second bottom defining the sub receiving space.

BRIEF DESCRIPTION OF THE DRAWINGS

Details of the present disclosure will become more apparent by describing exemplary embodiments thereof with reference to the accompanying drawings, in which.

DETAILED DESCRIPTION OF EXEMPLARY EMBODIMENTS

Hereinafter, the present disclosure will be explained in detail with reference to the accompanying drawings.

Figure 1:
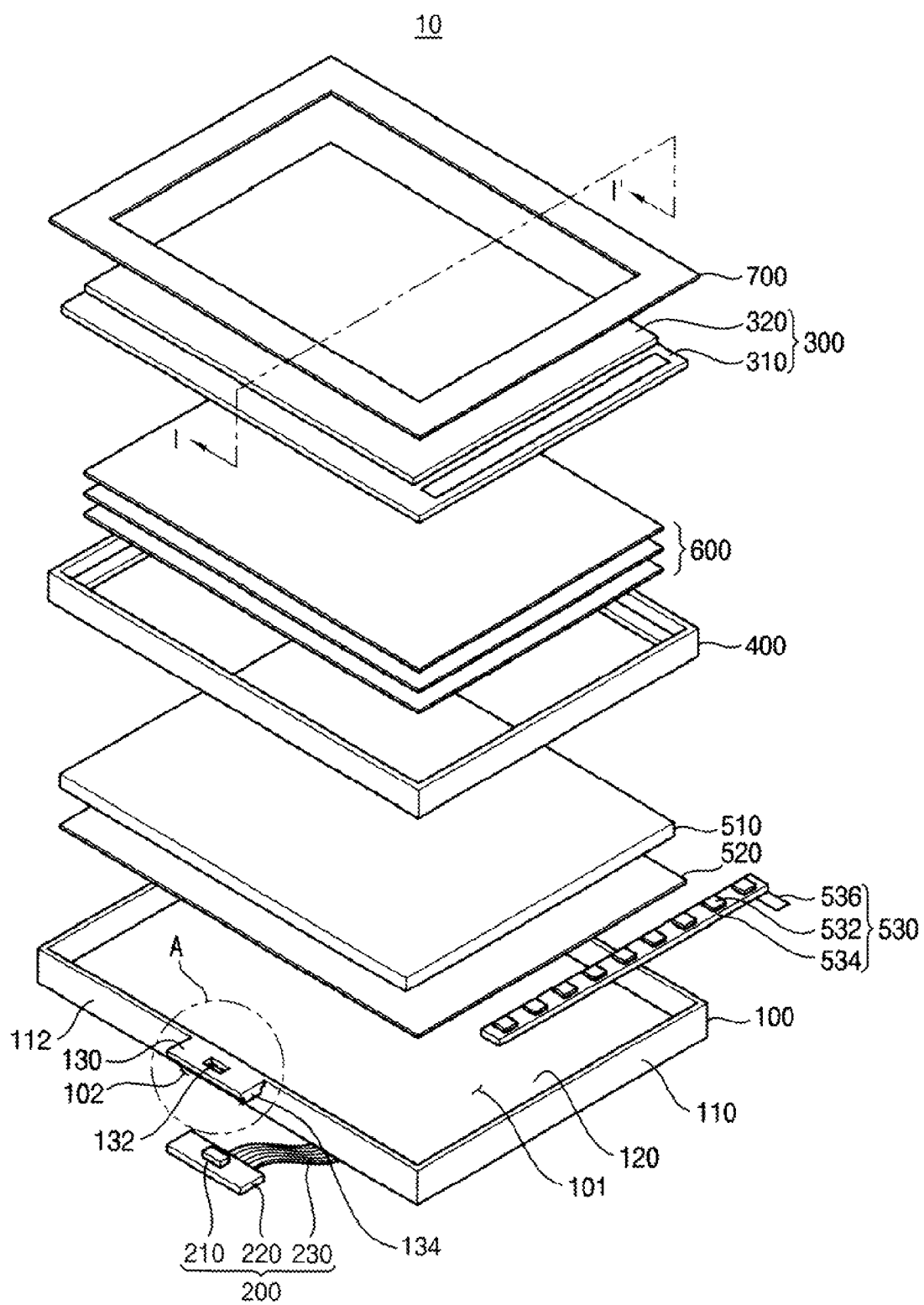
FIG. 1 is an exploded perspective view illustrating a display apparatus according to an exemplary embodiment of the present disclosure.
Figure 2:
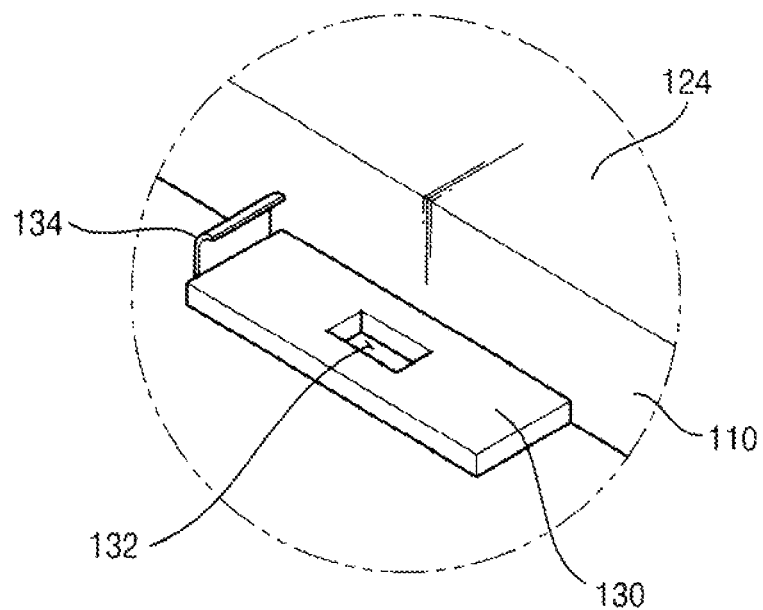
FIG. 2 is an enlarged rear view of a portion 'A' of a receiving container in FIG. 1.

FIG. 1 is an exploded perspective view illustrating a display apparatus according to an exemplary embodiment of the present disclosure. FIG. 2 is an enlarged rear view of a portion 'A' of a receiving container in FIG. 1.

Referring to FIGS. 1 and 2, a display apparatus 10 according to an exemplary embodiment includes a display panel 300, a camera module 200 and a receiving container 100. The display apparatus 10 may further include a light guide plate 510, a reflective plate 520, a light source module 530, a mold frame 400, optical sheets 600 and a cover tape 700.

The display panel 300 includes a first substrate 310 and a second substrate 320 facing each other. The display panel 300 may display an image by adjusting light transmissivity of a liquid crystal material disposed between the first and the second substrates 310 and 320.

The camera module 200 includes a lens part 210 and a printed circuit board ("PCB") 220 on which the lens part 210 is mounted. The camera module 220 may further include a first flexible film 230. The first flexible film 230 connects the PCB 220 with an external driving part.

The receiving container 100 receives the light source module 530, the light guide plate 510, the reflective plate 520, the optical sheets 600, the mold frame 400, the display panel 300 and the camera module 200. The receiving container 100 may be formed of a metal material. The receiving container 100 includes a main receiving space 101 and a sub receiving space 102. The receiving container 100 may be formed as one structure including the main receiving space 101 and the sub receiving space 102. The main receiving space 101 receives the display panel 300. The sub receiving space 102 may be extended away from the main receiving space 101 and receives the camera module 200.

The receiving container 100 includes sidewalls 110, a first bottom 120 connected to the sidewalls 110, and a second bottom 130 extended from a first sidewall 112 of the sidewalls 110. The first sidewall 112 may any of the sidewalls 110, selected according to the needs of an application. The main receiving space 101 is a space defined by the sidewalls 110 and the first bottom 120. The sub receiving space 102 is a space defined by the first sidewall 112 and the second bottom 130.

The second bottom 130 may be extended from an upper portion of the first sidewall 112. For example, the second bottom 130 is extended from the upper portion of the first sidewall 112 away from the main receiving space 101, and a lower portion of the second bottom 130 is defined as the sub receiving space 102.

A protrusion portion 134 is formed at a side of the second bottom 130 for receiving and fixing the camera module 200. The protrusion portion 134 may include an inwardly curved shape, and may receive and support the camera module 200. The protrusion portion 134 may be formed at a side of the second bottom 130, or may be formed at both sides of the second bottom 130.

The second bottom 130 includes an opening portion 132 formed in an area covering the lens part 210 of the camera module 200. The lens part 210 of the camera module 200 received at the sub receiving space 102 may be exposed through the opening portion 132.

The light guide plate 510 is disposed to face the light source module 530 in the direction in which the light source module 530 emits light. The light provided by the light source module 530 is incident into the light guide plate 510 through an incident surface of the light guide plate 510. The light incident into the light guide plate 510 exits through an exit surface of the light guide plate 510 disposed toward the optical sheets 600. The reflective sheet 520 is disposed to face a lower surface of the light guide plate 510, which is opposite to the exit surface. The optical sheets 600 are disposed to face the exit surface.

According to an exemplary embodiment, an edge-illumination type light source module 530 is illustrated, in which the light source module 530 is disposed at a side of the light guide plate 510. Alternatively, a direct-illumination type light source module in which the light guide plate is omitted and the light source module is disposed on the first bottom 120 may be implemented according to an exemplary embodiment of the present disclosure.

The light source module 530 may include a plurality of light sources 532 generating light and a circuit board 534. The circuit board 534 is electrically connected to the light sources 532 and transmits light source driving signals to the light sources 532. The circuit board 534 is electrically connected to a light source driving part (not shown) through a connecting line 536. The light source driving signals are provided to the circuit board 534 through the connecting line 536, and are supplied to each of the light sources 532 through the circuit board 534. For example, the light sources 532 may include a light emitting diode ("LED").

Figure 3:
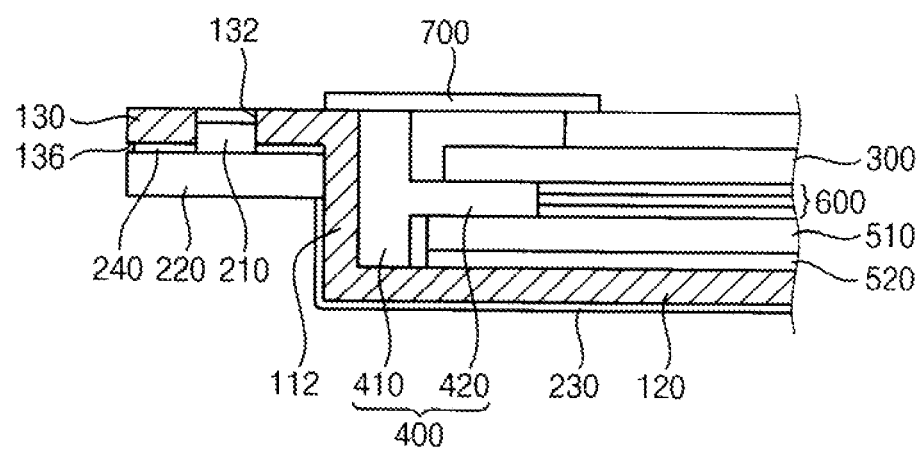
FIG. 3 is a cross-sectional view taken along a line I-I' in FIG. 1.

FIG. 3 is a cross-sectional view taken along a line I-I' in FIG. 1.

As shown in FIG. 3, the mold frame 400 includes a main body portion 410 and a supporting portion 420. The mold frame 400 may be formed of a plastic material. The main body portion 410 includes four sidewalls. The supporting portion 420 is formed at each of the sidewalls and is protruded toward the opposite sidewall. The light source module 530, the light guide plate 510 and the reflective plate 520 are disposed under the supporting portion 420 and fixed by the receiving container 100. The display panel 300 is disposed on the supporting portion 420 and supported by the supporting portion 420.

The cover tape 700 may be disposed on the display panel 300, and may surround and cover a peripheral area of the display panel 300.

Referring to FIGS. 1 to 3, the camera module 200 is received by the sub receiving space 102. The sub receiving space 102 is defined by the first sidewall 112 and the second bottom 130. The camera module 200 is received at the sub receiving space 102, so that the lens part 210 faces a lower surface 136 of the second bottom 130. For example, the camera module 200 is fixed to the lower surface 136 from a lower portion of the receiving container 100. An opening portion 132 is formed in an area about the lens part 210 of the camera module through the second bottom 130, so that the lens part 210 may be exposed therethrough.

The camera module 200 may fixed at the lower surface 136 of the second bottom 130 by an adhesion member 240. The adhesion member 240 may be an adhesion tape.

The first flexible film 230 of the camera module 200 is extended along a bottom surface 124 of the first bottom 120 of the receiving container 100. For example, the first flexible film 230 is extended from the PCB 220 of the camera module 200 along the bottom surface 124 of the first bottom 120, and may be connected to an external driving part. A connecting structure of the first flexible film 230 is described with reference to FIG. 4.

As described above, a sub receiving space 102 is formed at a side of a receiving container 100 receiving a display panel 300, and a camera module 200 is mounted in the sub receiving space 102. Thus, both of the display panel 300 and the camera module 200 may be received in one receiving container 100.

Figure 4:
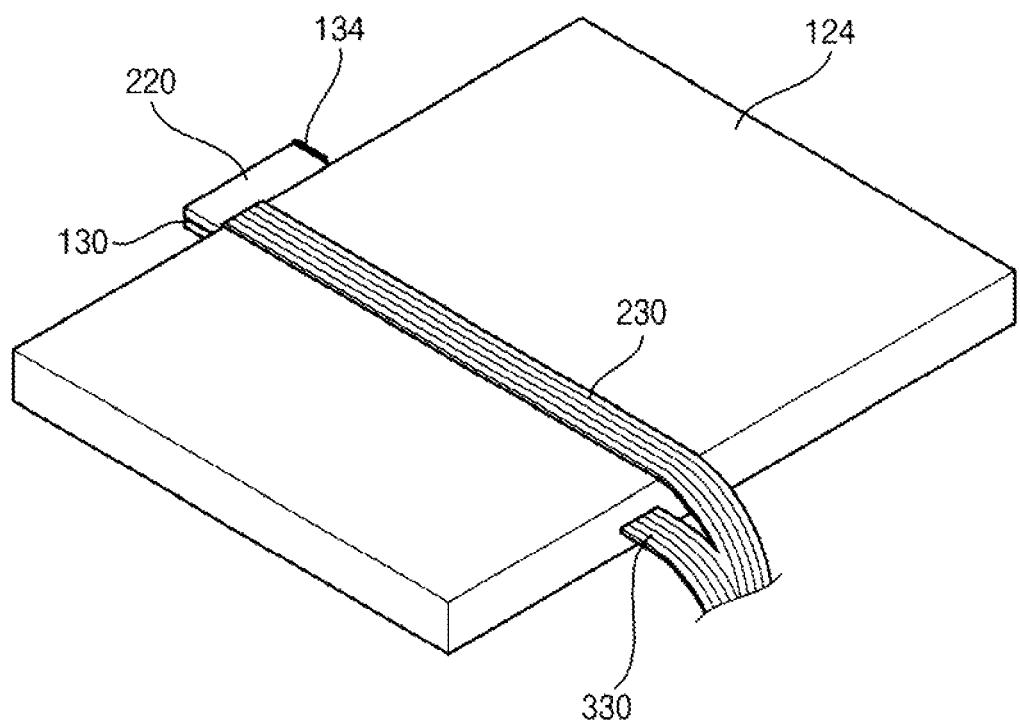
FIG. 4 is a rear view of the display apparatus in FIG. 1.

FIG. 4 is a rear view of the display apparatus in FIG. 1.

Referring to FIGS. 1 and 4, the first flexible film 230 of the camera module 200 may be extended along a bottom surface 124 of the first bottom 120 of the receiving container 100. For example, the first flexible film 230 is extended from the PCB 220 of the camera module along the bottom surface 124 of the first bottom 120, and may be connected to an external driving part.

In attaching the camera module 200, a cable connecting the camera module 200 to an external driving part may be extended along a side surface of a receiving container receiving a display panel. For example, the cable surrounds the side surface of the receiving container. However, according to an exemplary embodiment, a flexible film 230 connecting a camera module 200 to an external driving part may be extended on a bottom surface 124 of a receiving container.

The display panel 300 may further include a second flexible film 330. The second flexible film 330 may be connected to the external driving part. Since the first flexible film 230 is extended along the bottom surface 124 of the first bottom 120, the first flexible film 230 may be directly branched off from the second flexible film 330. Thus, the first and the second flexible films 230 and 330 may be branched off from a common flexible film.

Figure 5:
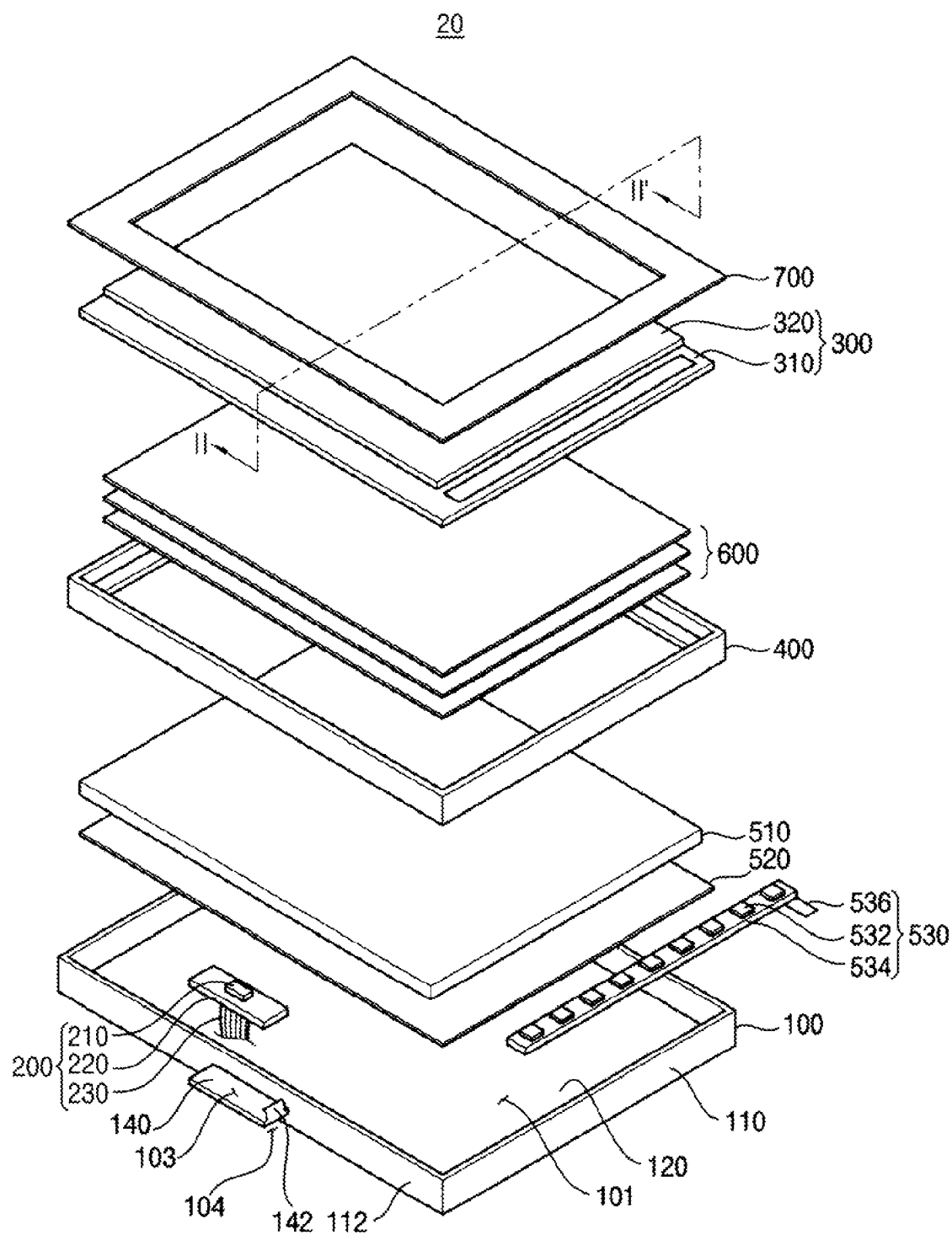
FIG. 5 is an exploded perspective view illustrating a display apparatus according to another exemplary embodiment of the present disclosure.
Figure 6:
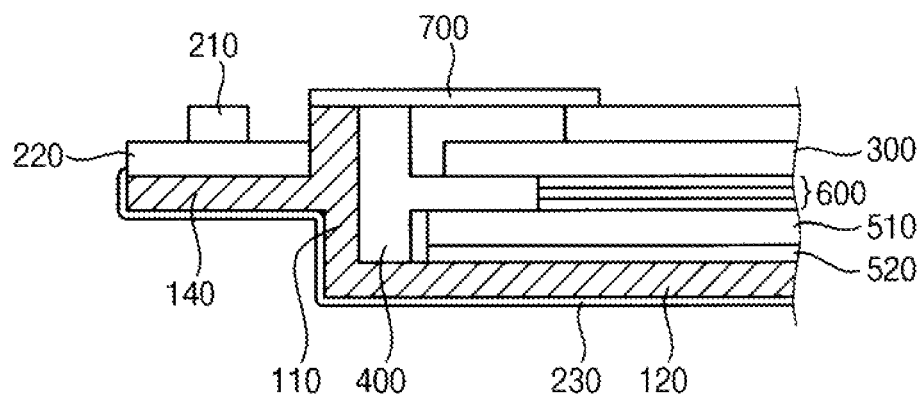
FIG. 6 is a cross-sectional view taken along a line II-II' in FIG. 5.

FIG. 5 is an exploded perspective view illustrating a display apparatus according to another exemplary embodiment of the present disclosure. FIG. 6 is a cross-sectional view taken along a line II-II' in FIG. 5. The display apparatus of FIG. 5 is substantially the same as the display apparatus of FIG. 1 except for a shape of the sub receiving space and a disposition of the camera module. The same numeral references are used for substantially similar components appearing in FIG. 1 and a detailed description of these components is omitted with reference to FIG. 5.

Referring to FIGS. 5 and 6, a display apparatus 20 includes the receiving container 100 having sidewalls 110, a first bottom 120 connected to the sidewalls 110 and a second bottom 140 extended from a first sidewall 112 of the sidewalls 110. The main receiving space 101 is a space defined by the sidewalls 110 and the first bottom 120. The upper and lower receiving spaces 103 and 104, respectively, are spaces defined by the first sidewall 112 and the second bottom 140.

The second bottom 140 may be extended outward from a central portion of the first sidewall 112. For example, the second bottom 140 is extended from the central portion of the first sidewall 112, and thus the second bottom 140 may include an upper receiving portion 103 and a lower receiving portion 104. The upper receiving portion 103 is defined by an upper portion of the first sidewall 112 and the second bottom 140. The lower receiving portion 104 is defined by a lower portion of the first sidewall 112 and the second bottom 140. For example, the sub receiving space includes the upper receiving portion 103 and the lower receiving portion 104.

The camera module 200 may be received in the upper receiving portion 103 so that the lens part 210 will face upwardly. For example, the camera module 200 is combined on an upper portion of the receiving container 100. The camera module 200 may be fixed to the second bottom 140 by an adhesion member.

The second bottom 140 may be extended from a position lower than a central position of the first sidewall 112 in the structure where the camera module 200 is received in the upper receiving portion 103.

A protrusion portion 142 may be formed at a side of the second bottom 140 for receiving and fixing the camera module 200. The protrusion portion 142 may include an inwardly curved shape, and may receive and support the camera module 200. The protrusion portion 142 may be formed at a side of the second bottom 140, or may be formed at both sides of the second bottom 140.

The first flexible film 230 of the camera module 200 may be bent to a side end of the second bottom 140 and may be extended along a bottom surface 124 of the first bottom 120. For example, the first flexible film 230 is bent from the PCB 220 of the camera module 200 to the side end of the second bottom 140, and is extended along the bottom surface 124 of the first bottom 120 and may be connected to an external driving part.

Therefore, a sub receiving space, e.g., upper receiving space 103, is further formed at a side end of a receiving container 100 receiving a display panel 300, and a camera module 200 is received in the sub receiving space, so that both of the display panel 300 and camera module 200 may be received in the same receiving container 100. The receiving container 100 according to an exemplary embodiment may receive the camera module 200 and the display panel 300.

A flexible film 230 connecting the camera module 200 with an external driving part may be extended on a bottom surface of the receiving container 100.

Figure 7:
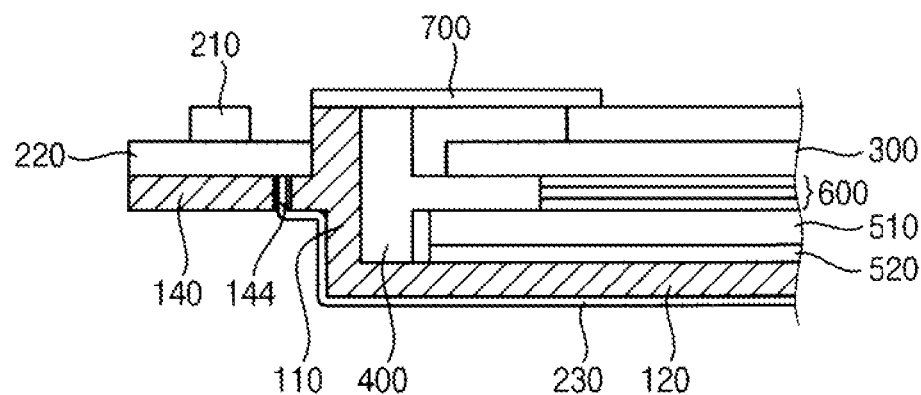
FIG. 7 is a cross-sectional view illustrating a display apparatus according to still another exemplary embodiment of the present disclosure.

FIG. 7 is a cross-sectional view illustrating a display apparatus according to still another exemplary embodiment of the present disclosure. The display apparatus of FIG. 7 is substantially the same as the display apparatus of FIGS. 5 and 6 except for an opening portion of the second bottom through which the first flexible film is extended on a bottom surface of the first bottom. The same numeral references are used for substantially similar components appearing in FIG. 5 and the detailed description of these components is omitted with reference to FIG. 7.

Referring to FIG. 7, an opening portion 144 may be formed through the second bottom 140 of the receiving part 100. The first flexible film 230 may pass through the opening portion 144. For example, the first flexible film 230 of the camera module 200 may pass from the PCB 220 of the camera module through the opening portion 144 formed through the second bottom 140, and may be extended on the bottom surface 124 of the first bottom 120, and may be connected to the external driving part.

Figure 8:
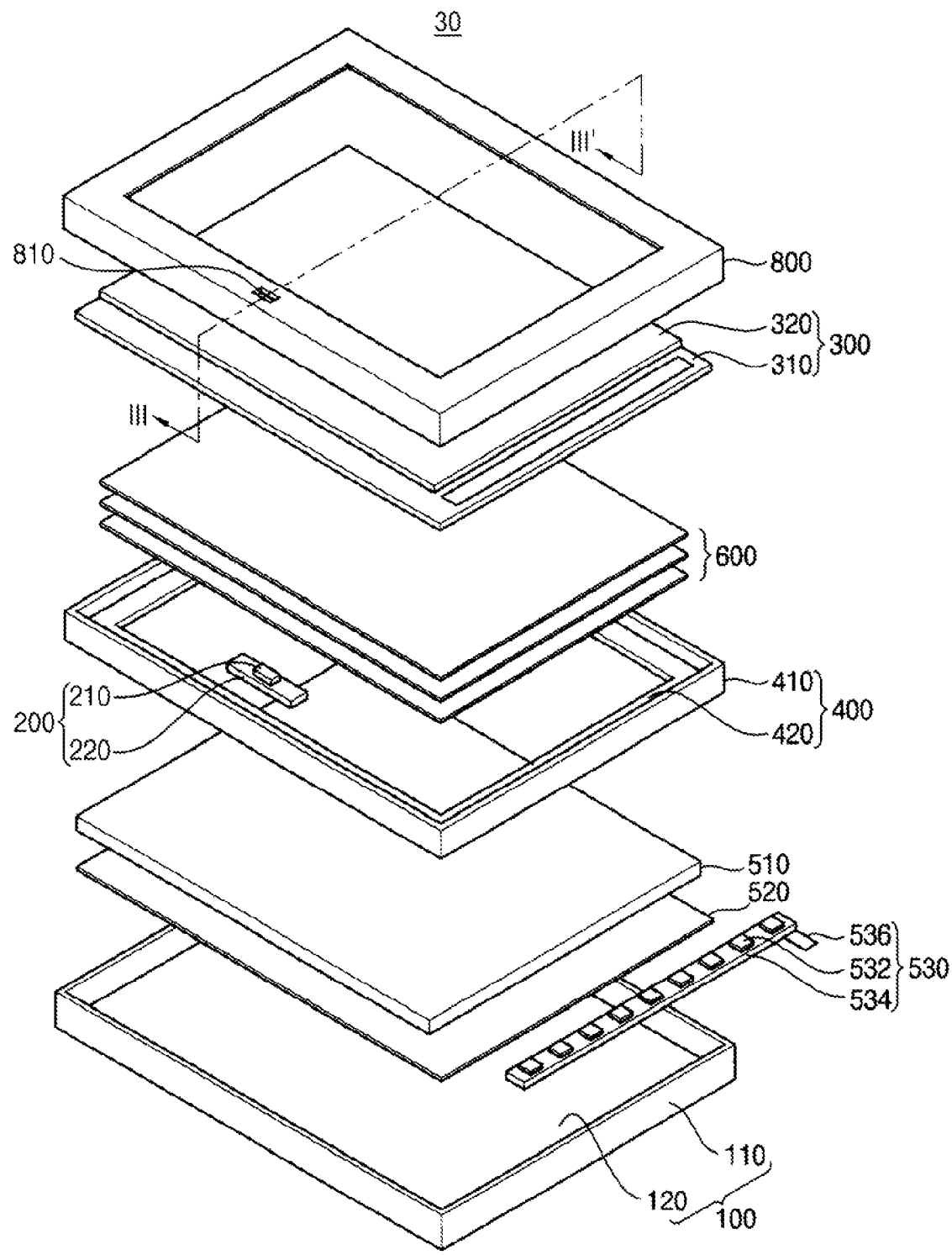
FIG. 8 is an exploded perspective view illustrating a display apparatus according to still another exemplary embodiment of the present disclosure.
Figure 9:
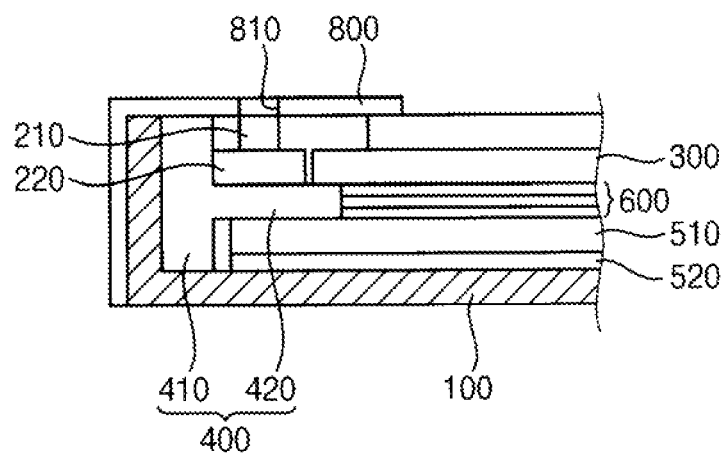
FIG. 9 is a cross-sectional view taken along a line III-III' in FIG. 8.

FIG. 8 is an exploded view illustrating a display apparatus according to still another exemplary embodiment of the present disclosure. FIG. 9 is a cross-sectional view taken along a line III-III' in FIG. 8. The display apparatus of FIG. 8 is substantially the same as the display apparatus of FIGS. 5 and 6 except that the receiving container does not include the sub receiving space, the camera module is disposed on the mold frame, and the display apparatus includes a top chassis.

The same numeral references are used for substantially similar components appearing in FIG. 5 and the detailed description of these components is omitted with reference to FIG. 8.

Referring to FIGS. 8 and 9, a display apparatus 30 according to an exemplary embodiment includes a display panel 300, a camera module 200, a mold frame 400 and a receiving container 100. The display apparatus 30 may further include a light guide plate 510, a reflective plate 520, a light source module 530, optical sheets 600 and a top chassis 800.

The receiving container 100 may receive the light guide module 530, the light guide plate 510, the reflective plate 520, the optical sheets 600, the mold frame 400, the display panel 300 and the camera module 200. The receiving container 100 includes sidewalls 110 and a first bottom 120 connected to the sidewalls 110.

According to an exemplary embodiment, the light source module is an edge-illumination type device in which the light source module 530 is disposed at a side of the light guide plate 510. Alternatively, a direct-illumination type device in which the light guide plate 510 is omitted and the light source module 530 is disposed on the first bottom 120 may be implemented.

The mold frame 400 includes a main body portion 410 and a supporting portion 420. The mold frame 400 may be formed of a plastic material. The main body portion 410 includes four sidewalls. The supporting portion 420 is formed at each of the sidewalls and is protruded toward an opposite sidewall. The light source module 530, the light guide plate 510 and the reflective plate 520 may be disposed under the supporting 420 and be fixed by the receiving container 100. The display panel 300 and the camera module 200 are disposed at an upper portion of the supporting portion 420 and are supported by the supporting part 420.

The camera module 200 may be disposed adjacent to a side end of the display panel 300. For example, the camera module 200 is disposed adjacent to the main body portion 410 on the supporting portion 420, and is disposed adjacent to the side end of the display panel 300 supported by the supporting portion 420. The supporting portion 420 supports both of the side end of the display panel 300 and the camera module 200. The camera module 200 is disposed such that the lens part 210 may face upwardly. The camera module 200 and the supporting portion 420 may be adhered to each other by an adhering member.

The top chassis 800 may be disposed on the display panel 300, covering edges of the display panel 300, the camera module 300 and sides of the mold frame 400. The top chassis 800 is combined with the receiving container 100, so that the top chassis 800 entirely covers the display panel 300 and the mold frame 400.

The top chassis 800 includes an opening portion 810 in an area about the lens part 210 of the camera module 200. The lens part 210 of the camera module 200 may be exposed upwardly through the opening portion 810.

According to an exemplary embodiment, a camera module and a display panel are disposed on, and received in, a mold frame of a display apparatus. Both the camera module and the display panel are thereby received. According to an exemplary embodiment, the camera module may be implemented in the display apparatus.

As described the above, a sub receiving space may be further formed at a side of a receiving container receiving a display panel, and a camera module is received in the sub receiving space, so that both of the display panel and the camera module may be received in one receiving container.

Moreover, a flexible film connecting the camera module to an external driving part may be extended through a bottom surface of the receiving container.

The foregoing is illustrative of the present disclosure and is not to be construed as limiting thereof. Although exemplary embodiments of the present disclosure have been described, those skilled in the art will readily appreciate that many modifications are possible in exemplary embodiments without materially departing from the novel teachings and advantages of the present disclosure. Accordingly, all such modifications are intended to be included within the scope of the present disclosure as defined in the claims. In the claims, means-plus-function clauses are intended to cover the structures described herein as performing the recited function and not only structural equivalents but also equivalent structures. Therefore, it is to be understood that the foregoing is illustrative of the present disclosure and is not to be construed as limited to specific exemplary embodiments disclosed, and that modifications to disclosed exemplary embodiments, as well as other exemplary embodiments, are intended to be included within the scope of the appended claims.

What is claimed is:

1. A display apparatus comprising:
a display panel adapted to display an image;
a camera module having a lens part mounted on a printed circuit board; and
a receiving container having a main receiving space receiving the display panel and a sub receiving space extended from the main receiving space and receiving the camera module,
wherein the receiving container further comprises sidewalls, a first bottom connected to the sidewalls and disposed in an area corresponding to the main receiving space, and a second bottom extended from a first sidewall of the sidewalls.

2. The display apparatus of claim 1,
wherein
the main receiving space is defined by the sidewalls and the first bottom, and the sub receiving space is defined by the first sidewall and the second bottom.

3. The display apparatus of claim 2, further comprising a protrusion portion formed at a side of the second bottom fixing a position of the camera module.

4. The display apparatus of claim 2,
wherein the second bottom is extended from an upper portion of the first sidewall and is not extended from a lower portion of the first sidewall, and the sub receiving space is formed on a lower surface of the second bottom in an area between the upper portion of the first sidewall and the lower portion of the first sidewall.

5. The display apparatus of claim 4,
wherein the second bottom comprises an opening portion through which the lens part is exposed at an upper surface of the second bottom.

6. The display apparatus of claim 4,
wherein the camera module is fixed to a lower surface of the second bottom by an adhesion member.

7. The display apparatus of claim 4,
wherein the camera module further comprises a first flexible film extended along a bottom surface of the first bottom opposite the main receiving space.

8. The display apparatus of claim 7,
wherein the display panel further comprises a second flexible film, and
the first flexible film and the second flexible film are branched out from a common flexible film.

9. The display apparatus of claim 2,
wherein the second bottom is extended from a central portion of the first sidewall, and
the sub receiving space comprises an upper receiving portion defined by an upper portion of the first sidewall and the second bottom and a lower receiving portion defined by a lower portion of the first sidewall and the second bottom.

10. The display apparatus of claim 9,
wherein the camera module is received at the upper receiving portion of the sub receiving space.

11. The display apparatus of claim 10,
wherein the camera module further comprises a first flexible film, and
the second bottom comprises an opening portion through which the first flexible film is extended along the first bottom opposite the main receiving space.

12. The display apparatus of claim 10,
wherein the camera module further comprises a first flexible film, and
the first flexible film is bent to a side end of the second bottom and is extended along the first bottom opposite the main receiving space.

13. The display apparatus of claim 12,
wherein the display panel further comprises a second flexible film, and
the first flexible film and the second flexible film are branched out from a common flexible film.

14. The display apparatus of claim 1,
wherein an upper area of a side end of the display panel is covered by a tape.

15. A display apparatus comprising:
a display panel adapted to display an image;
a camera module including a lens part mounted on a printed circuit board;
a mold frame supporting the display panel and the camera module; and
a receiving container receiving the display panel, the camera module and the mold frame,
wherein the mold frame and the receiving container are separate components.

16. The display apparatus of claim 15,
wherein the mold frame comprises a main body portion and a supporting portion protruding from the main body portion, and
a side end of the display panel and the camera module are adjacent to each other at the supporting portion.

17. The display apparatus of claim 15, further comprising a top chassis disposed over the display panel and covering the mold frame and the camera module,
wherein the top chassis and the receiving container are separate components.

18. The display apparatus of claim 17,
wherein the top chassis comprises an opening portion through which the lens part of the camera module is exposed.

19. A receiving container comprising:
a main receiving space receiving a display panel;
a sub receiving space extended away from the main receiving space and receiving a camera module;
a plurality of sidewalls and a first bottom connected to the sidewalls defining the main receiving space; and
a second bottom extended from a first sidewall of the sidewalls, the first sidewall and the second bottom defining the sub receiving space,
wherein the second bottom comprises a first end extending substantially perpendicularly from the first sidewall, a second end extending substantially perpendicularly from the first sidewall, and a third end connecting the first and second ends,
and the receiving container is formed as one structure.

20. The display apparatus of claim 15, wherein the receiving container further comprises sidewalls, a first bottom connected to the sidewalls and disposed in an area corresponding to the main receiving space, and a second bottom extended from a first sidewall of the sidewalls.

* * * * *